(12) United States Patent
Manassen et al.

(10) Patent No.: US 11,156,846 B2
(45) Date of Patent: Oct. 26, 2021

(54) HIGH-BRIGHTNESS ILLUMINATION SOURCE FOR OPTICAL METROLOGY

(71) Applicant: KLA-Tencor Corporation, Milpitas, CA (US)

(72) Inventors: Amnon Manassen, Haifa (IL); Andrew V. Hill, Berkeley, CA (US); Ohad Bachar, Timrat (IL); Avi Abramov, Haifa (IL)

(73) Assignee: KLA Corporation, Milpitas, CA (US)

( * ) Notice: Subject to any disclaimer, the term of this patent is extended or adjusted under 35 U.S.C. 154(b) by 22 days.

(21) Appl. No.: 16/430,861

(22) Filed: Jun. 4, 2019

(65) Prior Publication Data

US 2020/0333612 A1    Oct. 22, 2020

Related U.S. Application Data

(60) Provisional application No. 62/836,254, filed on Apr. 19, 2019.

(51) Int. Cl.
*G02B 27/09* (2006.01)
*G02B 27/48* (2006.01)
*G01N 21/47* (2006.01)

(52) U.S. Cl.
CPC ..... *G02B 27/0994* (2013.01); *G01N 21/4795* (2013.01); *G02B 27/0922* (2013.01);
(Continued)

(58) Field of Classification Search
CPC .................................................. G02B 27/0994
(Continued)

(56) References Cited

U.S. PATENT DOCUMENTS 5,208,654 A    5/1993  Shao et al.
7,277,229 B2 * 10/2007 Kato .................. G02B 27/0905
                                                        359/618
(Continued)

FOREIGN PATENT DOCUMENTS

CN    108429121 A    8/2018
CN    108808436 A    11/2018

OTHER PUBLICATIONS

International Search Report and Written Opinion dated Aug. 5, 2020 for PCT/US2020/028388.

*Primary Examiner* — Tarifur R Chowdhury
*Assistant Examiner* — Omar H Nixon
(74) *Attorney, Agent, or Firm* — Suiter Swantz pc llo

(57) ABSTRACT

An illumination source may include two or more input light sources, a collector, and any combination of a beam uniformizer, a speckle reducer, or any number of output fibers to provide a selected illumination etendue. The collector may include one or more lenses to combine illumination from the two or more input light sources into an illumination beam, where the illumination from the two or more input light sources occupy different portions of an input aperture of the collector. The beam uniformizer may include a first noncircular-core fiber to receive the illumination beam, a second noncircular-core fiber, and one or more coupling lenses to relay a far-field distribution of the illumination beam from the first noncircular-core fiber to an input face of the second noncircular-core fiber to provide output light with uniform near-field and far-field distributions.

50 Claims, 11 Drawing Sheets

(52) U.S. Cl.
CPC ..... *G02B 27/0955* (2013.01); *G02B 27/0977* (2013.01); *G02B 27/48* (2013.01); *G01N 2021/4704* (2013.01); *G01N 2021/4735* (2013.01)

(58) Field of Classification Search
USPC ........................................................ 356/225
See application file for complete search history.

(56) References Cited

U.S. PATENT DOCUMENTS

| | | |
|---|---|---|
| 7,535,631 B2 | 5/2009 | Brown et al. |
| 8,971,358 B2 | 3/2015 | Fermann et al. |
| 9,400,246 B2 | 7/2016 | Shchegrov et al. |
| 9,606,235 B2 | 3/2017 | Clair et al. |
| 9,958,385 B2 | 5/2018 | Manassen et al. |
| 10,025,107 B2 | 7/2018 | Kim |
| 2005/0141810 A1 | 6/2005 | Vaez-Iravani et al. |
| 2011/0157599 A1 | 6/2011 | Weaver et al. |
| 2014/0177034 A1* | 6/2014 | Lippey ................. H04N 9/3161 359/327 |
| 2014/0240951 A1 | 8/2014 | Brady et al. |
| 2015/0023628 A1 | 1/2015 | Fermann et al. |
| 2016/0258817 A1 | 9/2016 | Dholakia et al. |
| 2017/0045690 A1* | 2/2017 | Mahadevan .......... G01J 3/0218 |
| 2017/0123212 A1* | 5/2017 | Kawakami ............... G02B 5/02 |
| 2017/0146399 A1 | 5/2017 | Brady et al. |
| 2018/0023950 A1 | 1/2018 | Marciano et al. |
| 2018/0052099 A1 | 2/2018 | Hill et al. |
| 2019/0041329 A1* | 2/2019 | Hill ....................... G01J 3/0289 |
| 2019/0067894 A1 | 2/2019 | Stephen |

* cited by examiner

HIGH-BRIGHTNESS ILLUMINATION SOURCE FOR OPTICAL METROLOGY

CROSS-REFERENCE TO RELATED APPLICATION

The present application claims the benefit under 35 U.S.C. § 119(e) of U.S. Provisional Application Ser. No. 62/836,254, filed Apr. 19, 2019, entitled HIGH BRIGHTNESS ILLUMINATION SYSTEM FOR OVERLAY METROLOGY, naming Amnon Manassen, Andy Hill, Ohad Bachar, and Avi Abramov as inventors, which is incorporated herein by reference in the entirety.

TECHNICAL FIELD

The present disclosure relates generally to illumination sources for optical metrology systems and, more particularly, to high-brightness illumination sources based on multiple coherent input beams.

BACKGROUND

Illumination source brightness, or radiance, is related to the radiation power from a source per solid angle and spatial extent of the source. In a given optical system, the effective source brightness associated with light captured and directed through the system controls the intensity of light that may be provided as an output. In the context of optical metrology, the illumination source brightness thus limits the intensity of light on a sample and thus the measurement throughput possible at a given sensitivity. Accordingly, increasing the brightness of an illumination source may enable increased sampling rates, increased sensitivity per measurement, or a combination of the two. However, approaches to increasing source brightness must be balanced against increases in cost, system complexity, and system reliability. It may therefore be desirable to develop systems and methods for providing efficient high brightness illumination.

SUMMARY

An illumination source is disclosed in accordance with one or more illustrative embodiments of the present disclosure. In one illustrative embodiment, the illumination source includes two or more input light sources. In another illustrative embodiment, the illumination source includes a collector including one or more lenses to combine illumination from the two or more input light sources into an illumination beam, where the illumination from the two or more input light sources occupy different portions of an input aperture of the collector. In another illustrative embodiment, the illumination source includes a beam uniformizer. In one illustrative embodiment, the beam uniformizer includes a first noncircular-core fiber to receive the illumination beam. In another illustrative embodiment, the beam uniformizer includes a second noncircular-core fiber. In another illustrative embodiment, the beam uniformizer includes one or more coupling lenses to relay a far-field distribution of the illumination beam from the first noncircular-core fiber to an input face of the second noncircular-core fiber, where a near-field output distribution and a far-field output distribution of the illumination beam from the second noncircular-core fiber are uniform within a selected tolerance.

An illumination source is disclosed in accordance with one or more illustrative embodiments of the present disclosure. In one illustrative embodiment, the illumination source includes two or more input light sources. In another illustrative embodiment, the illumination source includes a collector including one or more lenses to combine illumination from the two or more input light sources into an illumination beam, where the illumination from the two or more input light sources occupy different portions of an input aperture of the collector. In another illustrative embodiment, the illumination source includes two or more output fibers having different etendues. In another illustrative embodiment, the illumination source includes a fiber coupler configured to selectively couple the illumination beam into a selected output fiber of the two or more output fibers to provide the illumination beam in a selected etendue.

A metrology system is disclosed in accordance with one or more illustrative embodiments of the present disclosure. In one illustrative embodiment, the metrology system includes two or more input light sources. In another illustrative embodiment, the metrology system includes a collector including one or more lenses to combine illumination from the two or more input light sources into an illumination beam, wherein the illumination from the two or more input light sources occupy different portions of an input aperture of the collector. In another illustrative embodiment, the metrology system includes one or more illumination optics to direct the illumination beam to a sample. In another illustrative embodiment, the metrology system includes one or more collection optics to direct radiation emitted by the sample in response to the illumination beam to a detector.

A beam uniformizer is disclosed in accordance with one or more illustrative embodiments of the present disclosure. In one illustrative embodiment, the beam uniformizer includes a first noncircular-core fiber to receive an illumination beam. In another illustrative embodiment, the beam uniformizer includes a second noncircular-core fiber. In another illustrative embodiment, the beam uniformizer includes one or more coupling lenses to relay a far-field distribution of the illumination beam from the first noncircular-core fiber to an input face of the second noncircular-core fiber, where a near-field output distribution and a far-field output distribution of the illumination beam from the second noncircular-core fiber are uniform within a selected tolerance.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Figure 1:
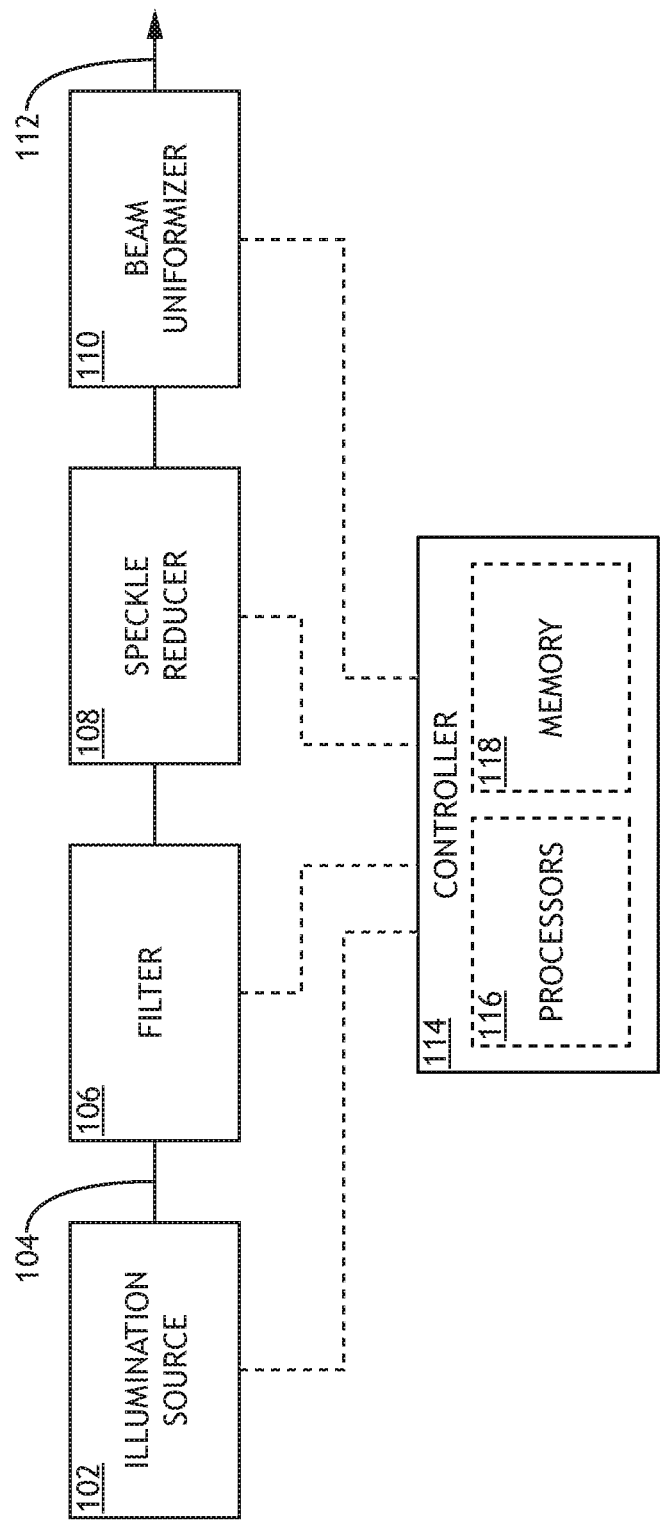
FIG. 1 is a block diagram view of a high-brightness illumination system, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for providing high-brightness illumination by combining multiple coherent illumination sources into a single output distribution. Additional embodiments of the present disclosure are directed to providing the combined output distribution into a selected etendue such that the combined sources may be compatible with an optical system such as, but not limited to, an optical metrology system. Further, although it is recognized that optical metrology and optical inspection may be terms of art in fields such as semiconductor fabrication and metrology, the terms optical metrology and optical metrology tool are used herein to generally describe any optical system suitable for, but not limited to, sample characterization and defect inspection.

Illumination source brightness critically impacts the design and performance of optical metrology systems. Illumination source brightness, or radiance, is related to the radiation power from a source per solid angle and spatial extent of the source. Further, radiance on a sample is limited by the radiance of the source.

It is generally desirable to provide a high-brightness illumination source to provide efficient and flexible use of light from the source. Accordingly, the design of an optical system such as a metrology system that may utilize an illumination source may incorporate tradeoffs between a desired optical invariant for the system, overall system cost, and desired performance metrics such as sensitivity and throughput based on the brightness of available sources. For example, an illumination source with a fixed brightness may impose constraints on the optical design that may require tradeoffs between performance metrics such as, but not limited to, illuminated area on a sample, sensitivity, and measurement throughput. By way of another example, increasing illumination source brightness in a system with a fixed etendue or optical invariant may enable increased sensitivity and/or measurement throughput without further modification to the system.

The brightness of an illumination source may generally be increased by increasing the radiated power from the illumination source or by decreasing any combination of the solid angle of emission or the spatial extent of the source (e.g., the etendue). Each of these factors may be constrained by technological limitations and/or design limitations of an associated system. For example, optical invariants of a system may constrain the possible solid angle of emission and/or the spatial extent of an illumination source based on desired radiance properties on a sample. In some applications such as, but not limited to, imaging overlay metrology, it may be desirable to limit or reduce the numerical aperture (NA) of illumination on the sample to improve accuracy. However, limiting the numerical aperture may correspondingly limit the spatial extent of the illumination source from which light may be collected and thus limit the effective brightness of the source.

As a result, it is typically desirable to increase source brightness by increasing radiated power within a selected or constrained etendue. However, directly increasing the radiated power of a given illumination source is often technically challenging and may require high costs for modest gains in brightness. For example, increasing laser pump power may increase the radiated power of an incoherent source such as a plasma-based source, but increasing laser pump power may also increase the plasma size (e.g., increased spatial extent of the source) and thus provide limited increases to the source brightness. By way of another example, increasing pump power of a coherent laser source (e.g., a supercontinuum laser source) may increase the radiated power, but this may negatively impact the gain material lifetime and may result in inefficient and costly sub-linear photon per dollar brightness increases.

In some embodiments of the present disclosure, an illumination source combines multiple coherent laser sources into a selected etendue to provide a high-brightness output beam. In this regard, the brightness of the common output may be related to the sum of the input sources. For example, the outputs of multiple lasers may be directed to a common collection optic, which combines the light into a single source beam. In this regard, the output of each laser may occupy a different portion of the input numerical aperture of a collection optic and the combined source beam will include the sum of the input laser sources.

Additional embodiments are directed to a beam uniformizer for providing a uniform output distribution in both the near and far fields. For example, a beam uniformizer may eliminate nonuniformities in a combined source beam associated with multiple input lasers described above to generate an output beam that is uniform in both the near and far fields within selected tolerances. However, it is recognized herein that a beam uniformizer in accordance with embodiments of the present disclosure may be suitable for providing uniform output based on a wide range of input sources including, but not limited to, a single source or a combination of multiple sources.

In some embodiments of the present disclosure, a beam uniformizer includes two fibers having cores with noncircular shapes (e.g., noncircular-core fibers). In this regard, the output of a first noncircular-core fiber may be spatially uniform in the near field, but may lack far-field uniformity (e.g., angular uniformity). By mapping a far-field distribution (e.g., corresponding to the angular distribution) of the first noncircular-core fiber onto an input face of a second noncircular core fiber, both near-field and far-field uniformity may be obtained.

Additional embodiments are directed to mitigating speckle associated with coherent laser sources. Speckle reduction may be achieved by generating multiple decorrelated speckle distributions within a relevant timeframe such as, but not limited to, an integration time of a detector. For example, speckle reduction may be obtained through a moving (e.g., rotating) diffuser plate. By way of another example, speckle reduction may be obtained by scanning light over an input face of a multimode optical fiber to provide varying speckle distributions at the output of the fiber. In some embodiments, light from a coherent illumination source may be scanned onto the input face of a noncircular-core fiber of a beam uniformizer as described herein.

Additional embodiments of the present disclosure are directed to providing illumination with a selected etendue. In this regard, the output from an illumination source may be matched to an etendue of an optical system such as, but not limited to, an optical metrology system. For example, light from a source with a relatively low etendue such as, but not limited to, a laser source may be efficiently coupled to a relatively larger etendue associated with a selected illumination mode (e.g., illumination field size and numerical aperture) of an optical system.

Additional embodiments of the present disclosure are directed to switching or otherwise controlling the illumination etendue of a high-brightness illumination source in accordance with the present disclosure. For example, the illumination etendue may be selected or otherwise switched based on a core size and/or a numerical aperture of a fiber in the source. Further, an illumination source may include multiple output fibers having different core sizes and/or numerical apertures such that the illumination etendue may be controlled by selecting the core size and/or numerical aperture of the output fiber. In some embodiments, an output fiber providing a selected etendue may include a beam uniformizer with one or more noncircular-core fibers as disclosed herein.

Additional embodiments of the present disclosure are directed to controlling the spectral shape and intensity of an output distribution of a high-brightness illumination source. For example, a series of tunable high-pass and low-pass spectral edge filters may rapidly tune the spectral bandwidth of output light. Further, a tunable intensity filter may provide output light with a selected intensity.

Referring now to FIGS. 1 through 8, systems and methods for providing high-brightness illumination will be described in greater detail.

FIG. 1 is a block diagram view of a high-brightness illumination system 100, in accordance with one or more embodiments of the present disclosure.

In one embodiment, the illumination system 100 includes an illumination source 102 to produce a source illumination beam 104. The illumination system 100 may further include additional components to modify or otherwise control spatial, temporal, and/or spectral characteristics of the source illumination beam 104. In another embodiment, the illumination system 100 includes one or more filters 106 to control the intensity and/or the spectral content of the source illumination beam 104. In another embodiment, the illumination system 100 includes a speckle reducer 108 to mitigate speckle associated with a coherent source illumination beam 104. In another embodiment, the illumination system 100 includes a beam uniformizer 110 to provide a uniform illumination beam 112 having a uniform spatial distribution in both the near field and the far field. For example, the beam uniformizer 110 may mitigate the presence of hotspots or other irregularities in the spatial or angular profile of light from the illumination source 102.

In another embodiment, the illumination system 100 includes a controller 114 communicatively coupled to at least one of the illumination source 102, the filters 106, the speckle reducer 108, or the beam uniformizer 110. In this regard, the controller 114 may provide one or more signals to one or more components of the illumination system 100 including, but not limited to, the illumination source 102, the filters 106, the speckle reducer 108, or the beam uniformizer 110 to direct or otherwise control various aspects of the source illumination beam 104 or the uniform illumination beam 112.

In another embodiment, the controller 114 includes one or more processors 116. In another embodiment, the one or more processors 116 are configured to execute a set of program instructions maintained in a memory medium 118, or memory. Further, the controller 114 may include one or more modules containing one or more program instructions stored in the memory medium 118 executable by the processors 116. The processors 116 of a controller 114 may include any processing element known in the art. In this sense, the processors 116 may include any microprocessor-type device configured to execute algorithms and/or instructions. In one embodiment, the processors 116 may consist of a desktop computer, mainframe computer system, workstation, image computer, parallel processor, or any other computer system (e.g., networked computer) configured to execute a program configured to operate the illumination system 100, as described throughout the present disclosure. It is further recognized that the term "processor" may be broadly defined to encompass any device having one or more processing elements, which execute program instructions from a non-transitory memory medium 118.

The memory medium 118 may include any storage medium known in the art suitable for storing program instructions executable by the associated processors 116. For example, the memory medium 118 may include a non-transitory memory medium. As an additional example, the memory medium 118 may include, but is not limited to, a read-only memory, a random-access memory, a magnetic or optical memory device (e.g., disk), a magnetic tape, a solid state drive and the like. It is further noted that memory medium 118 may be housed in a common controller housing with the processors 116. In one embodiment, the memory medium 118 may be located remotely with respect to the physical location of the processors 116 and controller 114. For instance, the processors 116 of controller 114 may access a remote memory (e.g., server), accessible through a network (e.g., internet, intranet and the like). Therefore, the above description should not be interpreted as a limitation on the present invention but merely an illustration.

It is recognized herein that the steps described throughout the present disclosure may be carried out by the controller 114. Further, the controller 114 may be formed from a single component or multiple components. It is further noted herein that the multiple components of the controller 114 may be housed in a common housing or within multiple housings. In this way, any controller or combination of controllers may be separately packaged as a module suitable for integration into the illumination system 100.

The illumination source 102 may include any type of light source known in the art. Further, the illumination source 102 may have any selected spectral content.

In one embodiment, the illumination source 102 includes one or more coherent sources such as, but not limited to, one or more laser sources. In this regard, the illumination source 102 may produce a source illumination beam 104 having high coherence (e.g., high spatial coherence and/or temporal coherence). For example, the illumination source 102 may include one or more broadband lasers such as, but not limited to, one or more supercontinuum lasers or white-light lasers. By way of another example, the illumination source 102 may include one or more narrowband lasers. By way of a further example, the illumination source 102 may include one or more tunable lasers to provide a source illumination beam 104 having tunable spectral intensity. Further, a coherent illumination source 102 may be based on any type of technology or product design. For example, the illumination source 102 may include, but is not limited to, any combination of one or more fiber lasers, one or more diode lasers, or one or more gas lasers.

In another embodiment, the illumination source 102 includes one or more low coherence sources to provide a source illumination beam 104 having low or partial coherence (e.g., low or partial spatial coherence and/or temporal coherence). For example, the illumination source 102 may include one or more light emitting diodes (LEDs). By way of another example, the illumination source 102 may include a laser-sustained plasma (LSP) source such as, but not limited to, an LSP lamp, an LSP bulb, or an LSP chamber suitable for containing one or more elements that, when excited by a laser source into a plasma state, may emit broadband illumination. By way of another example, the illumination source 102 may include a lamp source such as, but not limited to, an arc lamp, a discharge lamp, an electrode-less lamp, or the like.

Further, the illumination source 102 may include any combination of light sources. In one embodiment, the illumination source 102 includes one or more supercontinuum laser sources to provide broadband illumination and one or more partially-coherent high-brightness LEDs to supplement gaps in the spectrum of the one or more supercontinuum laser sources.

The illumination source 102 may further provide light having any selected temporal characteristics. In one embodiment, the illumination source 102 includes one or more continuous-wave sources to provide a continuous-wave source illumination beam 104. In another embodiment, the illumination source 102 includes one or more pulsed sources to provide a pulsed or otherwise modulated source illumination beam 104. For example, the illumination source 102 may include one or more mode-locked lasers, one or more Q-switched lasers, or the like.

The illumination source 102 may include or otherwise be formed from any number of input light sources. In one embodiment, the illumination source 102 includes a single light source to produce the source illumination beam 104. In another embodiment, the illumination source 102 combines light generated by multiple input light sources such as, but not limited to, multiple laser sources into a single output beam. In this regard, light from the multiple input light sources may be combined into a common etendue to provide high-brightness illumination.

Figure 2:
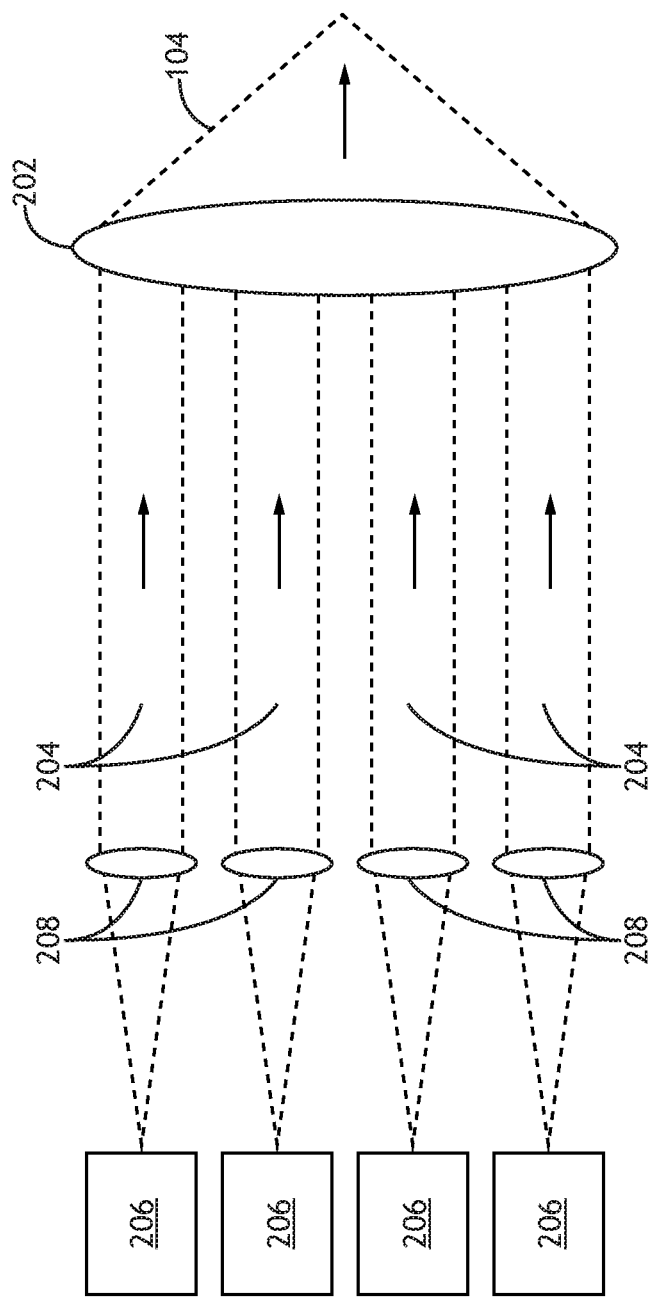
FIG. 2 is a conceptual view of an illumination source including a collector to combine input light from two or more input light sources into a single source illumination beam, in accordance with one or more embodiments of the present disclosure.

In some embodiments, the illumination source 102 generates source illumination beam 104 by combining light from multiple input light sources. FIG. 2 is a conceptual view of an illumination source 102 including a collector 202 to combine input light 204 from two or more input light sources 206 into a single source illumination beam 104, in accordance with one or more embodiments of the present disclosure. For example, the collector 202 may include one or more optical components such as, but not limited to, lenses or beamsplitters suitable for receiving input light 204 from multiple input light sources 206 and generating a combined source illumination beam 104. Accordingly, the power in the source illumination beam 104 may be the sum of the powers of the input light sources 206.

The illumination system 100 may include any number of input light sources 206 arranged in any selected distribution with respect to the collector 202. In one embodiment, the illumination system 100 includes multiple input light sources 206 having output optics (e.g., output fibers, output mirrors, or the like) arranged in a 2D array pattern (e.g., a 2D lattice pattern). For example, the output optics of multiple input light sources 206 may be arranged in a rectangular array, a triangular array, a hexagonal array, or the like. In another embodiment, the illumination system 100 includes multiple input light sources 206 arranged in a random or pseudo-random distribution.

The input light sources 206 may be arranged in any configuration to provide input light 204 within an input aperture of the collector 202. In one embodiment, as illustrated in FIG. 2, input light sources 206 are arranged to provide input light 204 within dedicated portions of an input numerical aperture of the collector 202. For example, as illustrated in FIG. 2, the collector 202 may receive collimated input light 204 from each input source 206 within dedicated portions of the input aperture of the collector 202. Further, the illumination system 100 may include one or more collimation lenses 208 to collimate the input light 204 from the input light sources 206. In another embodiment, though not shown, the input light 204 from the input light sources 206 may overlap within the input numerical aperture of the collector 202. For example, output fibers of fiber-based input light sources 206 may be arranged in a bundle such that the emerging input light 204 from the output fibers may overlap.

Each of the input light sources 206 may have any selected spectrum or power characteristics. In this regard, the spectrum of the source illumination beam 104 may be controlled based on the spectrum of the input light sources 206 and the power of the source illumination beam 104 may controlled based on the number and powers of input light sources 206. In one embodiment, the illumination system 100 includes multiple input light sources 206 having substantially similar spectra and/or powers. In another embodiment, the multiple input light sources 206 may have different spectra and/or powers.

It is to be understood, however, that FIG. 2 and the associated description is provided solely for illustrative purposes and should not be interpreted as limiting. Rather, the illumination source 102 may include any number of components to combine light from multiple sources into a single source illumination beam 104 using any technique known in the art. In one embodiment, the illumination source 102 combines input light from two input sources having orthogonal polarizations with a polarizing beam splitter to generate the source illumination beam 104. In another embodiment, the illumination source 102 combines input light from two or more input sources with substantially non-overlapping spectra using one or more dichroic beam splitters. In another embodiment, the illumination source 102 spatially or angularly packs input light from two or more input light sources into a selected etendue that may be, but is not required to be, larger than the etendue of any of the input light sources.

Figure 3:
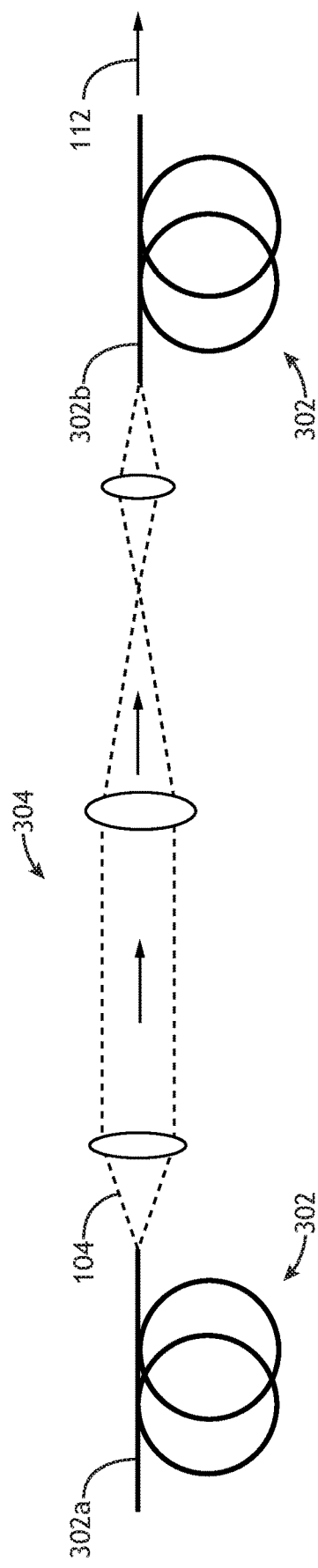
FIG. 3 is a conceptual view of the beam uniformizer, in accordance with one or more embodiments of the present disclosure.
Figure 4B:
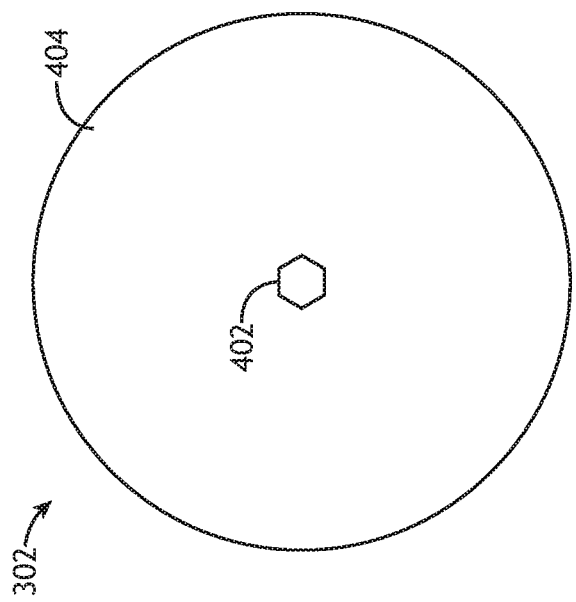
FIG. 4B is a cross-sectional view of a noncircular-core fiber having a hexagonal core, in accordance with one or more embodiments of the present disclosure.

Referring now to FIG. 3 through 4B, the beam uniformizer 110 will be described in greater detail. FIG. 3 is a conceptual view of the beam uniformizer 110, in accordance with one or more embodiments of the present disclosure. Uniform illumination may be beneficial for many applications including, but not limited to, optical metrology. However, not all illumination sources have sufficiently uniform spatial or angular output profiles. For example, a source illumination beam 104 from an extended illumination source or a combined illumination source (e.g., as illustrated in FIG. 2) may have a non-uniform spatial or angular profile, which may result in non-uniformities in either the near or far field. By way of another example, a source illumination beam 104 formed from multiple input laser sources (e.g., input light sources 206) having different spectra may exhibit spatially-varying spectral characteristics. Accordingly, the beam uniformizer 110 may provide a uniform illumination beam 112 having uniform spatial and spectral distributions in the near and far fields.

In one embodiment, the beam uniformizer 110 includes at least two noncircular-core fibers and coupling optics for relaying light between the noncircular-core fibers to provide a uniform illumination beam 112 that is uniform in both the near and far field. For example, FIG. 3 illustrates a beam uniformizer 110 having a first noncircular-core fiber 302a and a second noncircular-core fiber 302b, along with coupling optics 304 for relaying light exiting the first noncircular-core fiber 302a to the second noncircular-core fiber 302b, in accordance with one or more embodiments of the present disclosure.

It is recognized herein that a single noncircular-core fiber 302 may increase the spatial uniformity of an output distribution of light at an output face with respect to an input distribution of light at an input face. In this regard, a single noncircular-core fiber 302 may operate as a near-field beam uniformizer. However, it may be the case that a single noncircular-core fiber 302 may fail to uniformize the far-field distribution of light such that the far-field distribution may exhibit hot spots or other irregularities even when the near-field distribution near the output face is spatially uniform. Put another way, a single noncircular-core fiber 302 may uniformize the spatial distribution of light at an output face with respect to the spatial distribution of light at the input face, but may not necessarily uniformize the angular distribution of light exiting the fiber with respect to the angular distribution of light entering the fiber.

In one embodiment, as illustrated in FIG. 3, the beam uniformizer 110 may include coupling optics 304 to relay a far-field distribution (e.g., an angular distribution) of the output of the first noncircular-core fiber 302a to the input face of the second noncircular-core fiber 302b. A far-field distribution corresponds to the angular distribution of light from the first noncircular-core fiber 302a and may thus be representative of the far-field output distribution of the first noncircular-core fiber 302a, which may exhibit nonuniformities as described above. Accordingly, relaying this far-field distribution to the input face of the second noncircular-core fiber 302b accomplishes two things. First, any non-uniformities in the far-field distribution may be mitigated by the second noncircular-core fiber 302b. Thus, the near-field spatial distribution of the uniform illumination beam 112 from the second noncircular-core fiber 302b may be uniform (e.g., within a selected tolerance). Second, the uniform spatial distribution in the near field at the output of the first noncircular-core fiber 302a may be converted into a uniform angular distribution into the second noncircular-core fiber 302b. Thus, the angular or far-field distribution of the uniform illumination beam 112 from the second noncircular-core fiber 302b may also be uniform (e.g., within a selected tolerance).

The beam uniformizer 110 may include noncircular-core fibers (e.g., the first noncircular-core fiber 302a or the second noncircular-core fiber 302b) having cores with any size or shape suitable for uniformizing output light with respect to input light. It is further recognized herein that the etendue of the beam uniformizer 110 (and thus potentially the illumination system 100 as a whole) may be fixed by the total core size. Accordingly, it may be the case that design requirements associated with the wavelength and/or the etendue of an optical system may limit the total core size and thus limit the characteristics of the noncircular core fibers in the beam uniformizer 110 (e.g., the first noncircular-core fiber 302a or the second noncircular-core fiber 302b).

In one embodiment, at least one noncircular-core fiber in the beam uniformizer 110 includes a single multi-mode core at the operative wavelength or wavelengths of the illumination source 102. For example, a multi-mode noncircular core may have a noncircular cross-sectional shape in a plane perpendicular to the length of the fiber. For example, a multi-mode noncircular core may have a cross-sectional shape of a polygon with any number of straight edges. By way of another example, a multi-mode noncircular core may have a cross-sectional shape with one or more curved sides.

Figure 4A:
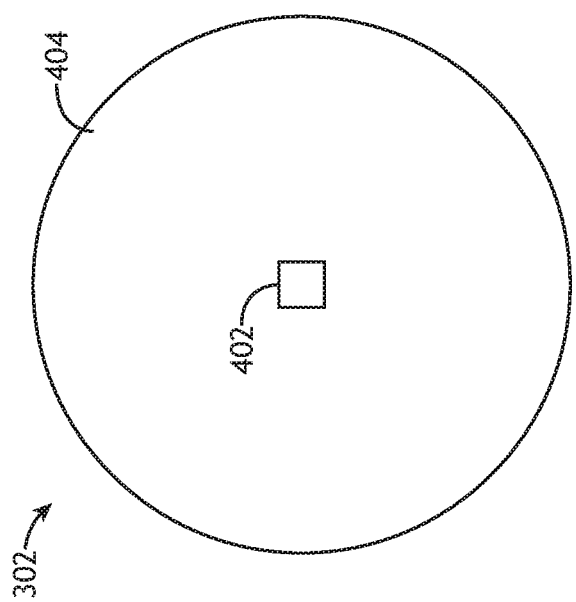
FIG. 4A is a cross-sectional view of a noncircular-core fiber having a square core, in accordance with one or more embodiments of the present disclosure.

FIGS. 4A and 4B are cross-sectional views of noncircular-core fibers, in accordance with one or more embodiments of the present disclosure. In particular, FIG. 4A is a cross-sectional view of a noncircular-core fiber 302 having a square core 402, while FIG. 4B is a cross-sectional view of a noncircular-core fiber 302 having a hexagonal core 402 (e.g., a regular hexagonal core 402). It is to be understood, however, that the examples of square and hexagonal cores illustrated in FIGS. 4A and 4B are provided solely for illustrative purposes and should not be interpreted as limiting. Further, a noncircular-core fiber 302 may have a single multi-mode core with any selected core size. For instance, a noncircular-core fiber 302 may have, but is not limited to, a square core (e.g., as illustrated in FIG. 4A) with 0.4 mm sides to provide a 0.22 NA, 0.2 mm sides to provide a smaller NA, 0.6 mm sides to provide a higher NA.

It is recognized herein that a bundle of closely-packed waveguides (e.g., a bundle of individual rods, a multicore fiber, or the like) arranged in a noncircular array may provide beam uniformizing in a similar manner as described herein with respect to a single noncircular-core fiber. In another embodiment, at least one noncircular-core fiber in the beam uniformizer 110 is a multi-core fiber with a core having a cross-sectional shape including a close-packed array or bundle of non-circular features. In another embodiment, at least one noncircular-core fiber in the beam uniformizer 110 includes a single multi-mode core at the operative wavelength having a noncircular cross-sectional shape that would otherwise be suitable for close packing or would unfold into a closely-packed array (e.g., a rectangle, a hexagon, or the like). In this regard, the core shape may mimic a bundle of closely-packed non-circular waveguides, but may operate as a single-core multi-mode fiber at a different size scale (e.g., to provide a desired etendue). For example, a beam uniformizer 110 suitable for use with wavelengths extending into the ultraviolet spectral range (e.g., suitable for integration with an optical metrology system) may include, but is not required to include, at least one single-core multimode fiber with a noncircular cross-sectional shape.

A noncircular-core fiber 302 (e.g., the first noncircular-core fiber 302a or the second noncircular-core fiber 302b) may be formed from any material or combination of materials by any process known in the art. For example, a core 402 and/or a cladding 404 may be formed from any material including, but not limited to, glass, polymer, or a crystalline material.

It may be the case that the efficacy of the uniformity may be influenced by various factors such as, but not limited to, the fiber length, the shape of the noncircular core or the size of the noncircular core. For example, increasing the fiber length may generally, though not necessarily linearly, increase the performance of the beam uniformizer 110.

Figure 5A:
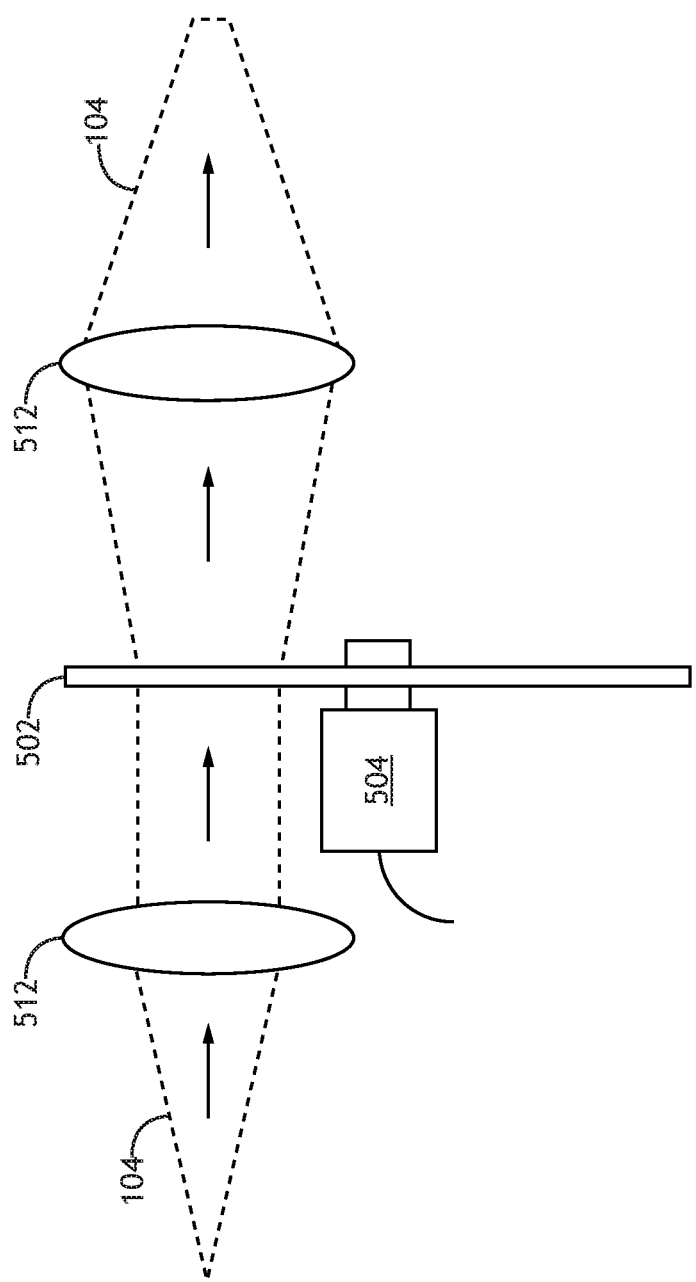
FIG. 5A is a conceptual view of a speckle reducer including a movable diffuser, in accordance with one or more embodiments of the present disclosure.
Figure 5B:
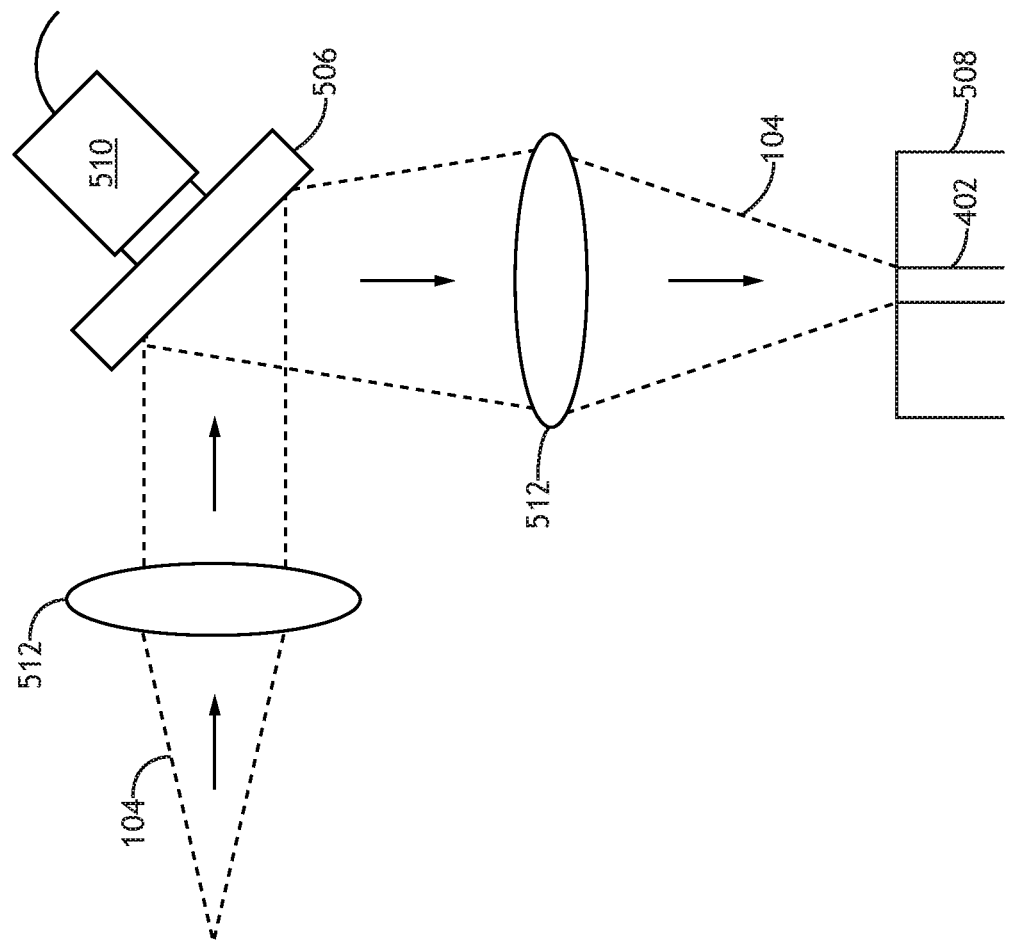
FIG. 5B is a conceptual view of a speckle reducer including a controllable mirror for positioning the source illumination beam at various locations on an input face of a fiber, in accordance with one or more embodiments of the present disclosure.

Referring now to FIGS. 5A and 5B, the speckle reducer 108 will be discussed in greater detail. In the case that the illumination source 102 provides a spatially coherent uniform illumination beam 112, it may be desirable to provide a speckle reducer 108 to generate multiple decorrelated speckle distributions within a selected timeframe. For example, it may be desirable to provide multiple decorrelated speckle distributions within an integration time of a detector of an optical metrology system. In this regard, the speckle associated with the spatially coherent source illumination beam 104 may not manifest as noise on the detector.

The speckle reducer 108 may include any number of components suitable for implementing any speckle reduction technique known in the art.

FIG. 5A is a conceptual view of a speckle reducer 108 including a movable diffuser 502, in accordance with one or more embodiments of the present disclosure. A diffuser 502 may include any type of material that randomly or pseudo-randomly scatters or spatially modifies the phase of incident light. For example, the diffuser 502 may include, but is not limited to, a ground glass plate, a pseudo-randomly etched plate, or the like. In one embodiment, the speckle reducer 108 includes a translator 504 to move the diffuser 502 at a rate sufficient to provide multiple decorrelated speckle distributions within a selected timeframe. For example, the translator 504 may include, but is not limited to, a rotation stage for rotating the diffuser 502 or a translation stage for linearly translating the diffuser 502.

FIG. 5B is a conceptual view of a speckle reducer 108 including a controllable mirror 506 for positioning the source illumination beam 104 at various locations on an input face of a fiber 508, in accordance with one or more embodiments of the present disclosure. It is recognized herein that a speckle distribution of light emerging from a fiber depends on the particular paths of the many wavefronts propagating through the fiber. Accordingly, the output speckle distribution may be varied by temporally modifying various aspects of the light path including, but not limited to, the input angle or the position of the fiber.

In one embodiment, as illustrated in FIG. 5B, the speckle reducer 108 includes a translator 510 to modify the position of the controllable mirror 506 to scan or otherwise vary the input angle or position of the source illumination beam 104 on an input face of the fiber 508. Further, the controllable mirror 506 may be, but is not required to be, controlled by the controller 114. The controllable mirror 506 may include any type of moveable or deformable mirror known in the art. For example, the controllable mirror 506 may include a galvanometer. By way of another example, the controllable mirror 506 may include a resonant scanner. By way of another example, the controllable mirror 506 may include a mirror attached to one or more rotation or translation stages.

Further, the controllable mirror 506 may scan or otherwise direct the source illumination beam 104 over any selected portion of the core of the fiber 508 (e.g., the core 402). In one embodiment, the controllable mirror 506 overfills the core of the fiber 508 by scanning or otherwise directing the source illumination beam 104 over an area larger than the core of the fiber 508. In another embodiment, the controllable mirror 506 underfills the core of the fiber 508 by scanning or otherwise directing the source illumination beam 104 over an area smaller than the core of the fiber 508. In another embodiment, the controllable mirror 506 scans or otherwise directs the source illumination beam 104 over an area matching the core of the fiber 508.

In another embodiment, the speckle reducer 108 includes one or more optical elements 512 to control the spatial size of the source illumination beam 104. For example, as illustrated in FIG. 5A, the optical elements 512 may expand and/or collimate the source illumination beam 104 on the diffuser 502 to a selected size based on the size of various structures on the diffuser 502 providing scattering and/or phase modification. By way of another example, the optical elements 512 may expand and/or collimate the source illumination beam 104 on the translator 504. Further, the optical elements 512 may focus the source illumination beam 104 to a desired spot size suitable for coupling with any subsequent components such as, but not limited to, the first noncircular-core fiber 302a of the beam uniformizer 110. For instance, the speckle reducer 108 may utilize scattering of the source illumination beam 104 by the diffuser 502 in FIG. 5A or the translator 504 in FIG. 5B to provide the source illumination beam 104 into a selected etendue (e.g., associated with a core size of the fiber 508).

The fiber 508 may include any type of fiber known in the art. In one embodiment, the speckle reducer 108 includes a dedicated fiber 508. In another embodiment, fiber 508 may correspond to the first noncircular-core fiber 302a of the beam uniformizer 110. In this regard, the speckle reducer 108 may direct the source illumination beam 104 into the beam uniformizer 110. In some embodiments, the speckle reducer 108 does not include a fiber 508, but provides multiple decorrelated speckle distributions of the source illumination beam 104 in any selected plane.

Further, as described previously herein, an optical fiber may be characterized as having an inherent etendue based on the core size and the numerical aperture (NA) of the fiber. However, it is recognized that the effective NA of a fiber may be adjusted to some extent by underfilling the fiber. Accordingly, the etendue of the illumination system 100 providing illumination through an optical fiber may be controlled or otherwise defined by the etendue of the optical fiber. In some embodiments, the illumination system 100 includes two or more output fibers having different etendues (e.g., different core sizes and/or different numerical apertures) and a fiber coupler to direct illumination (e.g., the source illumination beam 104) into a selected output fiber to provide a selected system etendue (e.g., a selected illumination etendue).

Figure 5C:
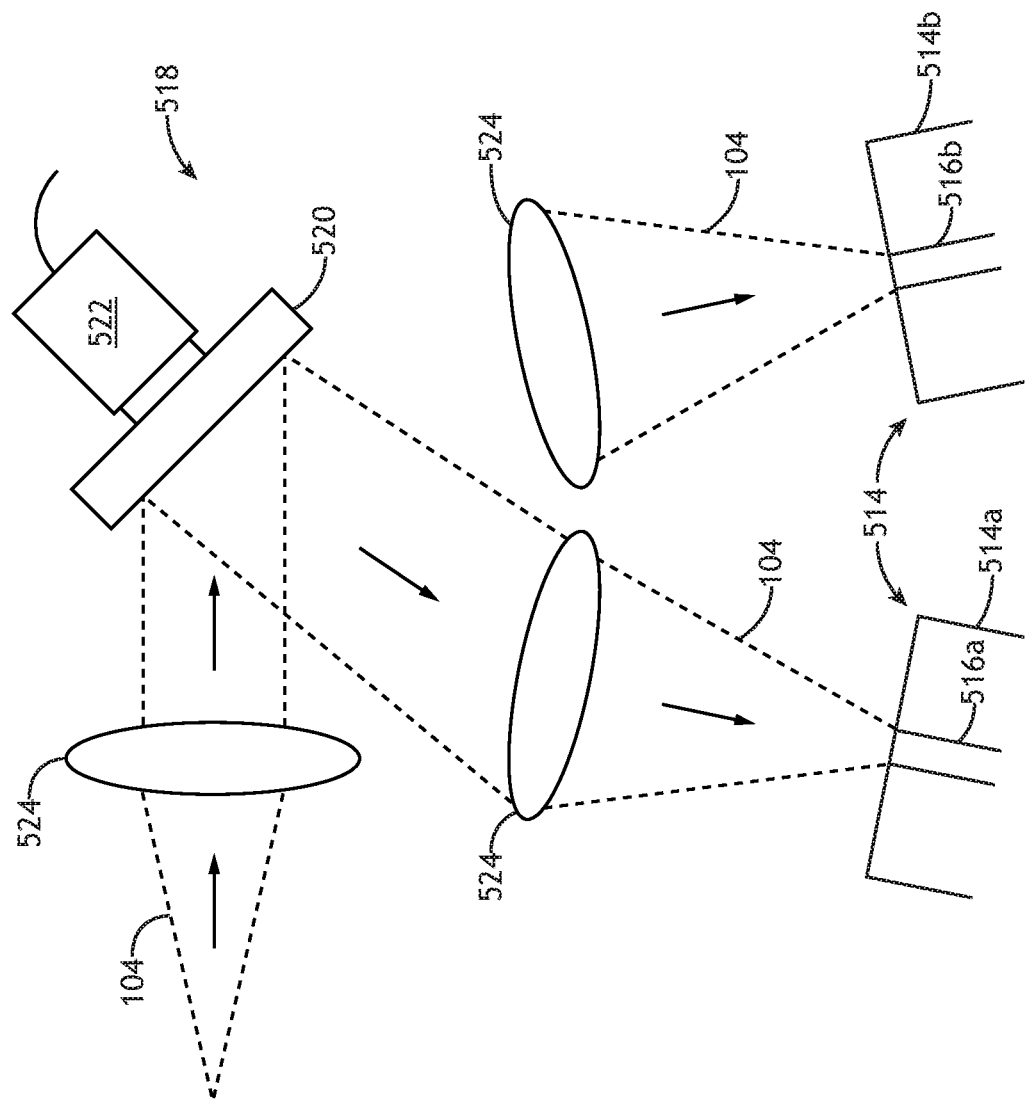
FIG. 5C is a conceptual view of etendue switching by selectively directing source illumination beam 104 into a first selected fiber to provide a selected system etendue, in accordance with one or more embodiments of the present disclosure.
Figure 5D:
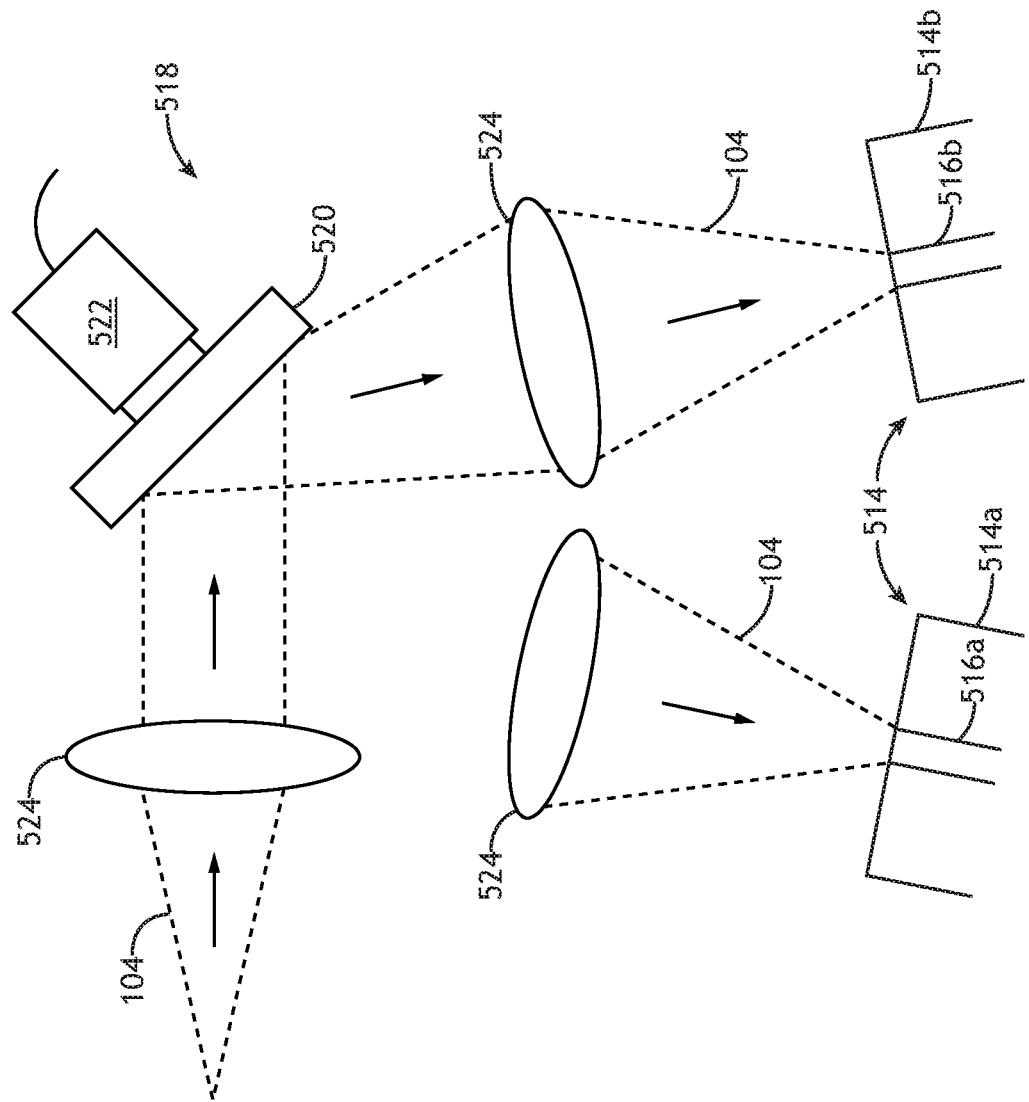
FIG. 5D is a conceptual view of etendue switching by selectively directing source illumination beam 104 into a second selected fiber to provide a selected system etendue, in accordance with one or more embodiments of the present disclosure.

FIGS. 5C and 5D are conceptual views of etendue switching by selectively directing source illumination beam 104 into selected fibers to provide a selected system etendue, in accordance with one or more embodiments of the present disclosure. In one embodiment, the illumination system 100 may include multiple output fibers 514 (e.g., output fibers 514a, 514b in FIG. 5C) having different core sizes and/or numerical apertures. For example, the output fiber 514a may have a core 516a having a first size or NA and the output fiber 514b may have a second core 516b having a second size or NA. In another embodiment, the illumination system 100 includes a fiber coupler 518 to direct light into the selected output fiber 514 to provide a selected system etendue.

The fiber coupler 518 may include any type of fiber coupler known in the art. In one embodiment, as illustrated in FIGS. 5C and 5D, the fiber coupler 518 may include a translatable mirror 520 (e.g., a galvanometer, or the like) and an associated translator 522 and one or more coupling optical elements 524 (e.g., lenses). For example, the fiber coupler 518 may include the controllable mirror 506 of the speckle reducer 108. In another embodiment, though not shown, the fiber coupler 518 may include one or more translation devices to position a selected output fiber 514 in a beam path of the source illumination beam 104. The fiber coupler 518 may also be configured to adjust the NA of the output fiber 514 and thus the system etendue by controlling the NA used to couple light into the selected output fiber 514.

Further, the output fibers 514 may include any type of optical fiber. In one embodiment, the illumination system 100 includes multiple beam uniformizers 110 having fibers with different core sizes and/or numerical apertures providing different etendues. In this case, the fiber coupler 518 (e.g., the controllable mirror 506 of the speckle reducer 108 illustrated in FIG. 5B, or the like) may select a particular beam uniformizer 110 providing a selected illumination etendue suitable for coupling into any external system (e.g., an optical metrology system, or the like). In another embodiment, the illumination system 100 includes any number of selected output fibers 514 as final system elements to provide a selected illumination etendue.

Further, though not shown, any external components or systems to which the illumination system 100 may provide illumination (e.g., an optical metrology system, or the like) may have one or more elements suitable for receiving output from any of the selected output fibers 514. For example, if the light from the output fibers 514 may be distinguished based on spectral content, polarization, or the like, an external system may include one or more beamsplitters to direct light from each of the output fibers 514 to a common beam path. By way of another example, an external system may include a fiber coupler as described in the context of FIG. 5C to selectively receive light from a selected output fiber 514 and direct the light along a defined path.

Figure 6:
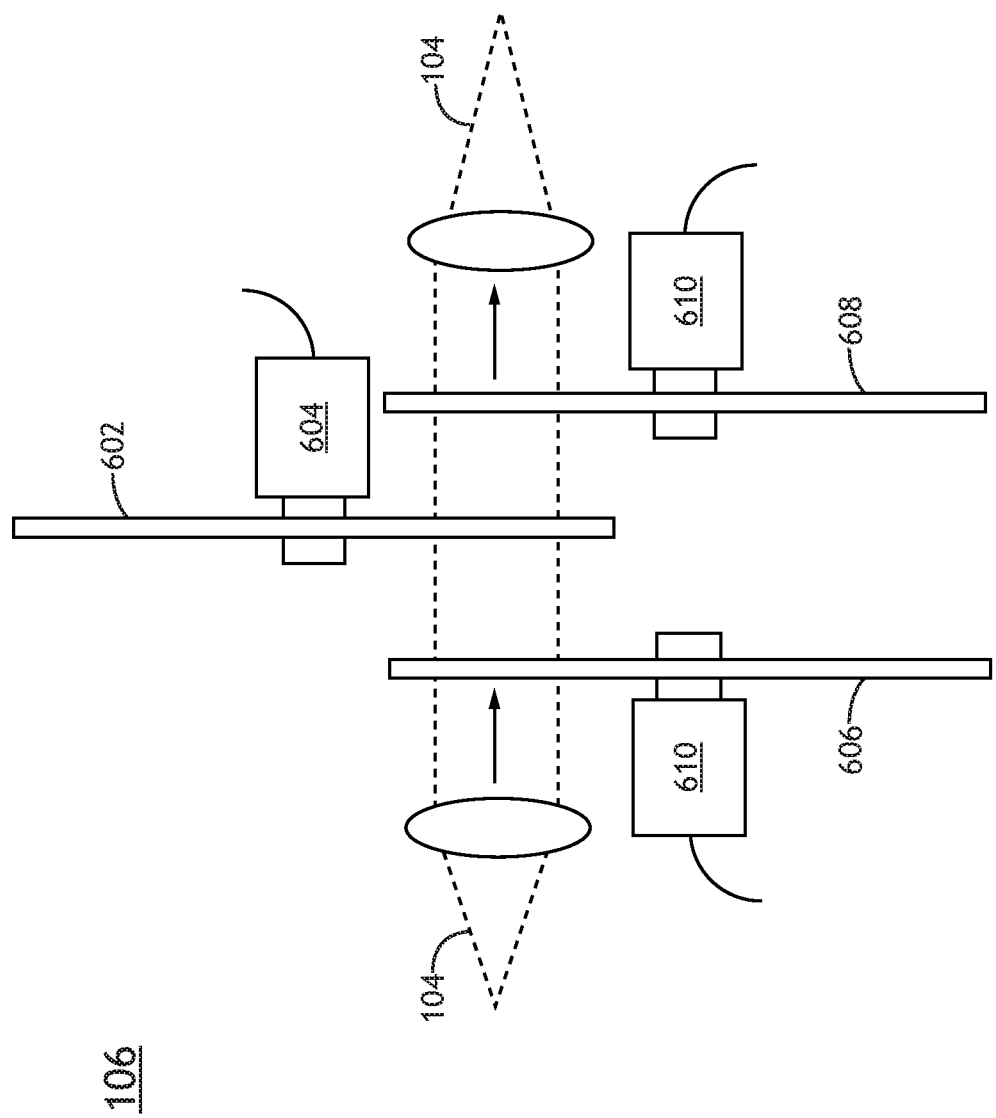
FIG. 6 is a conceptual view of the one or more filters, in accordance with one or more embodiments of the present disclosure.

FIG. 6 is a conceptual view of the one or more filters 106, in accordance with one or more embodiments of the present disclosure. In one embodiment, at least one of the one or more filters 106 are communicatively coupled with the controller 114 such that the controller 114 may control various characteristics of the source illumination beam 104.

In one embodiment, the one or more filters 106 include at least one tunable intensity filter 602 to selectively control the intensity of the source illumination beam 104. For instance, the tunable intensity filter 602 may include a position-varying neutral density filter (e.g., a gradient filter or the like). In this regard, the intensity of the source illumination beam 104 may be controlled (e.g., by translator 604) by adjusting the position of the tunable intensity filter 602 with respect to the source illumination beam 104. For example, as illustrated in FIG. 6, the tunable intensity filter 602 may include a circular gradient filter such that the intensity of the source illumination beam 104 passed by the tunable intensity filter 602 may be selected by rotating the circular gradient filter to a selected location. By way of another example, though not shown, the tunable intensity filter 602 may include a linear gradient filter such that the intensity of the source illumination beam 104 passed by the tunable intensity filter 602 may be selected by translating the linear gradient filter to a selected location with one or more translation stages.

In another embodiment, the one or more filters 106 include at least one tunable spectral filter (e.g., tunable high-pass filters, tunable low-pass filters, tunable bandpass filters, or tunable notch filters) to selectively control the spectral characteristics of the source illumination beam 104. For instance, the tunable spectral filter may include one or more position-varying filters such as, but not limited to, one or more tunable edge filters in which a cutoff wavelength may be tuned based on the position or angle of the source illumination beam 104. For example, as illustrated in FIG. 6, the one or more filters 106 may include a circular tunable high-pass filter 606 and a circular tunable low-pass filter 608 in which the high-pass and low-pass cutoff wavelengths may be selected by rotating the respective filters. In this regard, spectral characteristics of the source illumination beam 104 (e.g., a center wavelength, a bandwidth, a spectral transmissivity value or the like) may be rapidly tuned by modifying the position of the tunable high-pass filter 606 and/or the tunable low-pass filter 608 with respect to the source illumination beam 104 (e.g., by translators 610).

It is to be understood, however, that the filters 106 illustrated in FIG. 6, as well as the associated description, is provided solely for illustrative purposes and should not be interpreted as limiting. Rather, the illumination system 100 may include any type or combination of intensity and/or spectral controllers known in the art. Further, in some embodiments, though not shown, the source illumination beam 104 may be translated (e.g., with a beam scanner, or the like) to selected locations on any of the filters (e.g., the tunable intensity filter 602, the tunable high-pass filter 606, and/or the tunable low-pass filter 608) to provide tuning.

Figure 7:
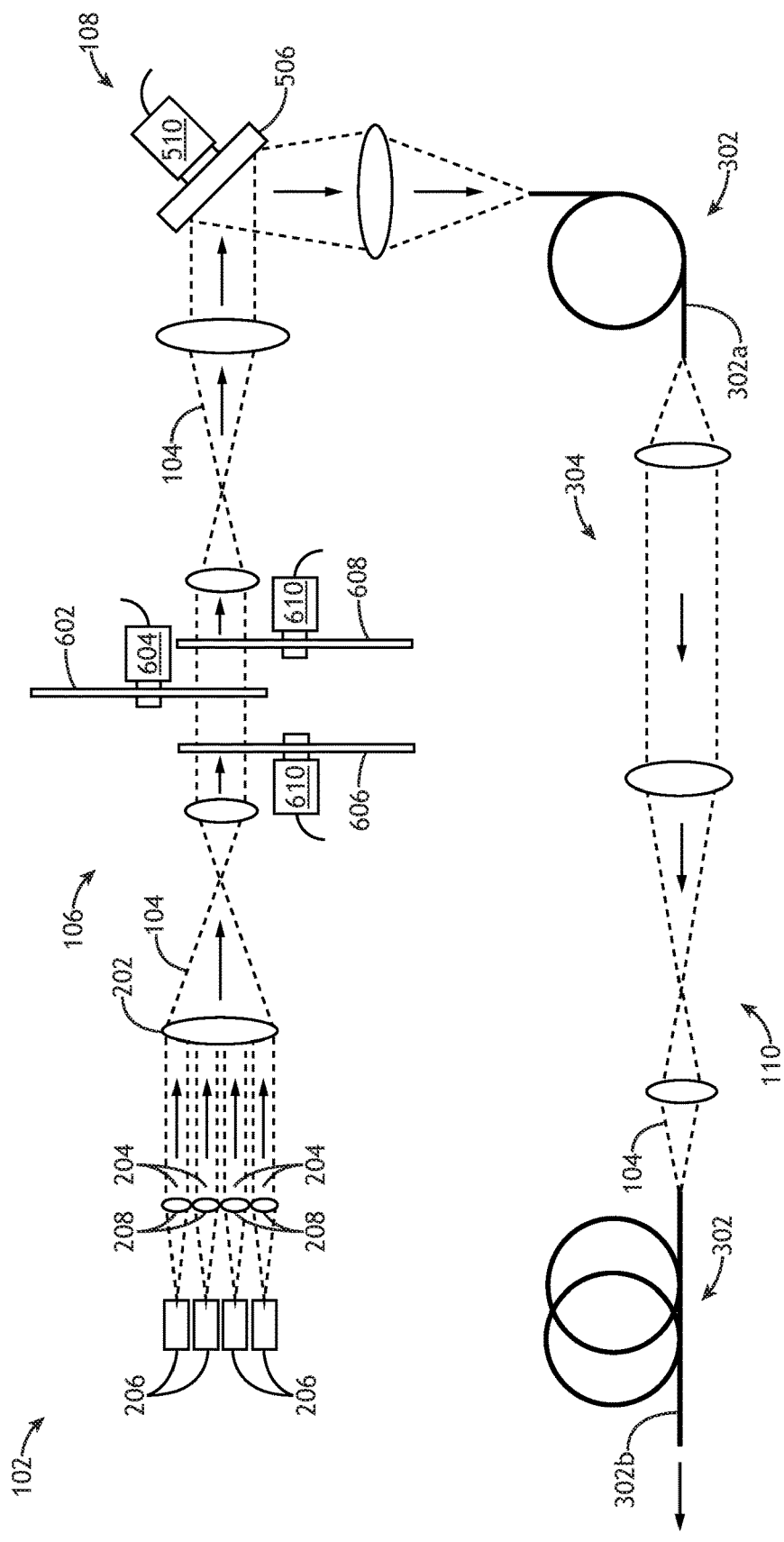
FIG. 7 is a conceptual view of the illumination system configured to provide high-brightness coherent illumination, in accordance with one or more embodiments of the present disclosure.
Figure 8:
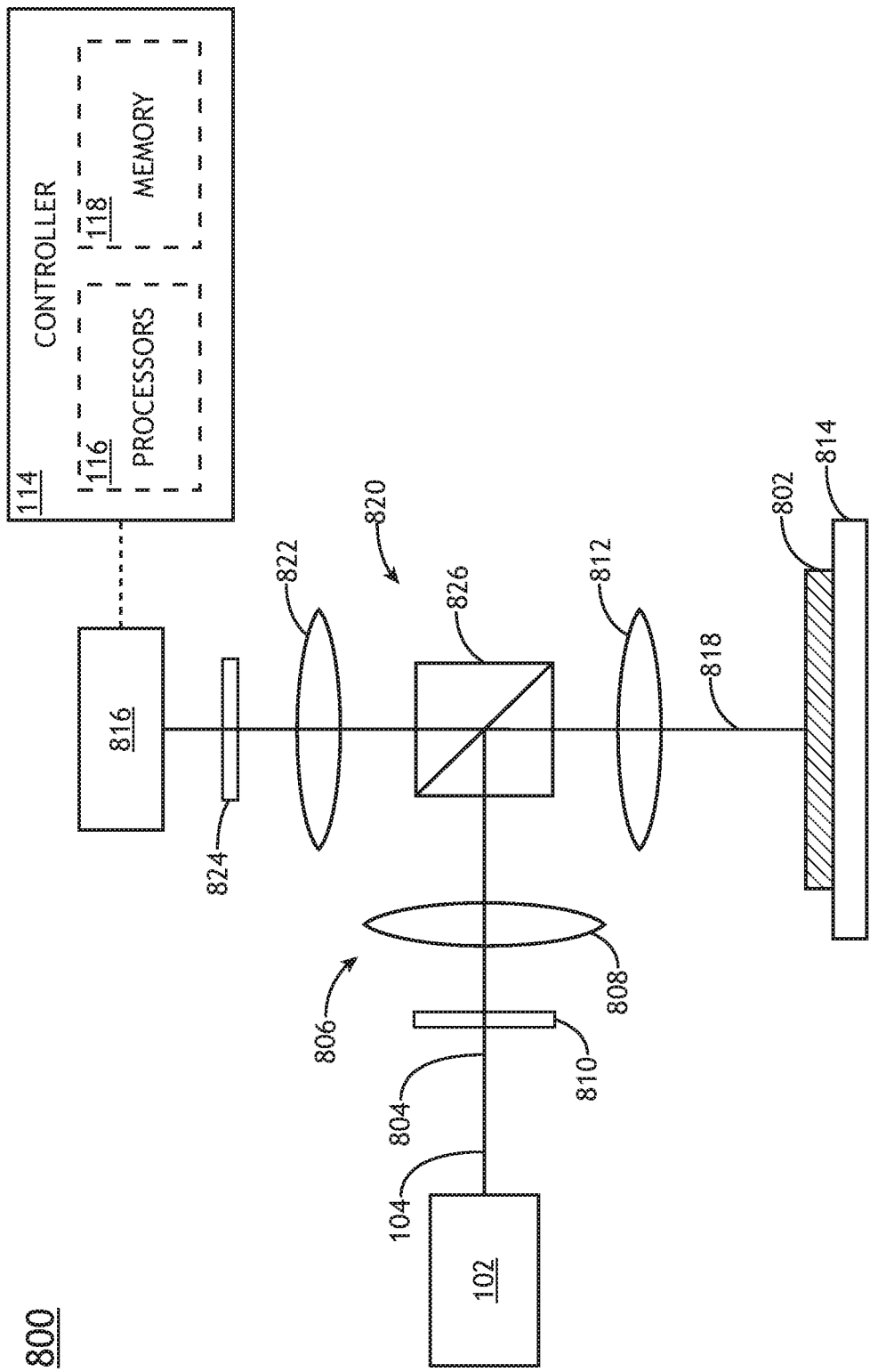
FIG. 8 is a conceptual view of an optical metrology tool including a high-brightness illumination system, in accordance with one or more embodiments of the present disclosure.

Referring now to FIGS. 7 and 8, the integration of various components of the illumination system 100 as well as the integration of the illumination system 100 into external systems is described in greater detail.

In a general sense, the various components of the illumination system 100 illustrated in FIG. 1 (e.g., the illumination source 102, the filters 106, the speckle reducer 108, and/or the beam uniformizer 110) may be integrated in any combination and order suitable for providing a uniform illumination beam 112 having selected characteristics. Further, in some embodiments, the illumination system 100 includes a subset of the components illustrated in FIG. 1.

For example, FIG. 7 is a conceptual view of the illumination system 100 configured to provide high-brightness illumination, in accordance with one or more embodiments of the present disclosure. In one embodiment, the illumination system 100 includes an illumination source 102 configured as illustrated in FIG. 2, filters 106 configured as illustrated in FIG. 6, a speckle reducer 108 configured as illustrated in FIG. 5B, and a beam uniformizer 110 configured as illustrated in FIG. 3. For example, the illumination source 102 may include a collector 202 to collect illumination from multiple coherent laser sources (e.g., supercontinuum laser sources, narrowband laser sources, partially coherent LED sources, or the like) into a common etendue to provide a high-brightness source illumination beam 104. The filters 106 may include a tunable intensity filter 602 and one or more tunable spectral filters (e.g., a tunable high-pass filter 606 and a tunable low-pass filter 608) to provide a source illumination beam 104 having selected intensity and spectral characteristics. The speckle reducer 108 may then include a controllable mirror 506 to scan the source illumination beam 104 across the input face of the beam uniformizer 110 (e.g., the first noncircular-core fiber 302a). Accordingly, the speckle reducer 108 may simultaneously mitigate speckle associated with the coherent input light sources 206 and provide coupling of the source illumination beam 104 into the beam uniformizer 110. It is recognized herein that the source illumination beam 104 formed from the multiple input light sources 206 may exhibit substantial nonuniformities (e.g., hot spots and the like). Accordingly, the beam uniformizer 110 may provide a uniform illumination beam 112 having a uniform distribution in both the near and far fields (e.g., within selected tolerances). Further, the etendue of the illumination system 100 may be controlled by the core size of the fibers in the beam uniformizer 110 (e.g., the second noncircular-core fiber 302b). The combination of the collector 202, the filters 106, the speckle reducer 108, and the beam uniformizer 110 may thus provide a high-brightness tunable coherent illumination source based on the combination of multiple input light sources 206 into a selected etendue.

It is to be understood, however, that the example embodiment in FIG. 7 and the associated descriptions are provided solely for illustrative purposes and should not be interpreted as limiting. Rather, the illumination system 100 may be formed from any combination of components in any selected order. For example, it may be advantages to modify the order of the filters 106, the speckle reducer 108, and/or the beam uniformizer 110. Further, not all components must be included in every configuration. For example, the speckle reducer 108 may not be required, particularly in applications where a partial or low coherence illumination source 102 is used. By way of another example, it may be the case that the filters 106 or one or more components thereof are not needed for a particular application.

In some embodiments, individual components provided herein as part of the illumination system 100 may be provided separately as stand-alone components. For example, the beam uniformizer 110 may be provided as an independent device suitable for use with a wide variety of input light sources.

In some embodiments, the illumination system 100 may be integrated into one or more external systems. For example, the illumination system 100 may provide a uniform high-brightness uniform illumination beam 112 suitable for use in optical metrology systems.

FIG. 8 is a conceptual view of an optical metrology tool 800 including a high-brightness illumination system 100, in accordance with one or more embodiments of the present disclosure. The optical metrology tool 800 may be configured as any type of metrology tool known in the art including, but not limited to, an imaging metrology tool for generating one or more images of a sample 802 or a scatterometry metrology tool for analyzing the scattering and/or diffraction of light from a sample 802. Further, the metrology tool may be utilized in any application including, but not limited to, metrology for characterizing one or more aspects of fabricated structures (e.g., an overlay metrology tool, or the like) or an inspection tool for detecting defects on patterned or unpatterned samples.

In one embodiment, the optical metrology tool 800 includes an illumination system 100 to generate a uniform illumination beam 112 having high brightness in a selected etendue suitable for integration with the optical metrology tool 800. For example, the illumination system 100 may be, but is not required to be, configured as illustrated in FIG. 7. Further, the uniform illumination beam 112 may have any spectral width. In one embodiment, the illumination system 100 provides broadband coherent illumination (e.g., based on multiple supercontinuum laser sources).

In another embodiment, the optical metrology tool 800 directs the uniform illumination beam 112 from the illumination system 100 as an illumination beam 804 to the sample 802 via an illumination pathway 806. The illumination pathway 806 may include one or more optical components suitable for modifying and/or conditioning the illumination beam 804 as well as directing the illumination beam 804 to the sample 802. For example, the illumination pathway 806 may include, but is not required to include, one or more lenses 808 (e.g., to collimate the illumination beam 804, to relay pupil and/or field planes, or the like) or one or more beam-controlling elements 810 to modify the illumination beam 804. For example, the beam-controlling elements 810 may include, but are not limited to, one or more polarizers, one or more filters, one or more beam splitters, one or more diffusers, one or more homogenizers, one or more apodizers, one or more beam shapers, or one or more mirrors (e.g., static mirrors, translatable mirrors, scanning mirrors, or the like). In another embodiment, the optical metrology tool 800 includes an objective lens 812 to focus the illumination beam 804 onto the sample 802 (e.g., an overlay target with overlay target elements located on two or more layers of the sample 802). In another embodiment, the sample 802 is disposed on a sample stage 814 suitable for securing the sample 802 and further configured to position the sample 802 with respect to the illumination beam 804.

In another embodiment, the optical metrology tool 800 includes one or more detectors 816 configured to capture radiation emanating from the sample 802 (e.g., an overlay target on the sample 802) (e.g., sample radiation 818) through a collection pathway 820 and generate one or more overlay signals indicative of overlay of two or more layers of the sample 802. The collection pathway 820 may include multiple optical elements to direct and/or modify illumination collected by the objective lens 812 including, but not limited to one or more lenses 822 or one or more beam-controlling elements 824 to modify the sample radiation 818. For example, the beam-controlling elements 824 may include, but are not limited to, one or more filters, one or more polarizers, one or more beam blocks, or one or more beamsplitters.

The detector 816 may receive any distribution of sample radiation 818 suitable for a particular application. For example, the detector 816 may receive an image of the sample 802 provided by elements in the collection pathway 820 (e.g., the objective lens 812, the one or more lenses 822, or the like). By way of another example, a detector 816 may receive radiation reflected or scattered (e.g., via specular reflection, diffuse reflection, and the like) from the sample 802. By way of another example, a detector 816 may receive radiation generated by the sample 802 (e.g., luminescence associated with absorption of the illumination beam 804, and the like). By way of another example, a detector 816 may receive one or more diffracted orders of radiation from the sample 802 (e.g., 0-order diffraction, ±1 order diffraction, ±2 order diffraction, and the like). In this regard, the detector 816 may receive a pupil plane image associated with an angular distribution of the sample radiation 818 in response to the illumination beam 804.

The illumination pathway 806 and the collection pathway 820 of the optical metrology tool 800 may be oriented in a wide range of configurations suitable for illuminating the sample 802 with the illumination beam 804 and collecting radiation emanating from the sample 802 in response to the incident illumination beam 804. For example, as illustrated in FIG. 8, the illumination system 100 may include a beamsplitter 826 oriented such that the objective lens 812 may simultaneously direct the illumination beam 804 to the sample 802 and collect radiation emanating from the sample 802. By way of another example, the illumination pathway 806 and the collection pathway 820 may contain non-overlapping optical paths.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An illumination source comprising:
  two or more input light sources;
  a collector including one or more lenses to combine illumination from the two or more input light sources into an illumination beam, wherein the illumination from the two or more input light sources occupy different portions of an input aperture of the collector; and
  a beam uniformizer comprising:
    a first noncircular-core fiber, wherein the first fiber receives the illumination beam;
    a second noncircular-core fiber; and
    one or more coupling lenses to relay a far-field distribution of the illumination beam from the first noncircular-core fiber to an input face of the second noncircular-core fiber, wherein a core size of at least one of the first noncircular-core fiber or the second noncircular-core fiber is selected to provide that a near-field output distribution and a far-field output distribution of the illumination beam from the second noncircular-core fiber are uniform within a selected tolerance; and
  an output fiber having at least one of a core size or a numerical aperture different than the beam uniformizer and providing an etendue different than an etendue of the beam uniformizer.

2. The illumination source of claim 1, wherein the collector combines the light from the two or more input light sources into a common etendue.

3. The illumination source of claim 1, further comprising:
  two or more collimating lenses to collimate the light from the two or more input light sources, wherein the collector receives the light from the two or more input light sources from the two or more collimating lenses.

4. The illumination source of claim 1, wherein a core of at least one of the first noncircular-core fiber or the second noncircular-core fiber has a shape of a regular hexagon, a rectangle, or a square.

5. The illumination source of claim 1, further comprising:
  one or more additional output fibers having different etendues than the output fiber; and
  a fiber coupler configured to selectively couple the illumination beam into the output fiber or the one or more additional output fibers to provide the illumination beam in a selected etendue.

6. The illumination source of claim 1, wherein at least one of the two or more input light sources comprises:
  a coherent light source.

7. The illumination source of claim 6, wherein the coherent light source comprises:
  a laser source.

8. The illumination source of claim 7, wherein the laser source comprises:
  a supercontinuum laser source.

9. The illumination source of claim 6, further comprising:
  a speckle reducer including at least one phase-varying optical element to generate a plurality of decorrelated distributions of the illumination beam within a selected timeframe to mitigate speckle in the illumination beam.

10. The illumination source of claim 9, wherein the speckle reducer comprises:
  a movable diffuser.

11. The illumination source of claim 9, wherein the speckle reducer comprises:
  a translatable mirror configured to vary a position of the illumination beam on an input face of the first noncircular-core fiber.

12. The illumination source of claim 11, wherein the translatable mirror overscans the illumination beam across the input face of the first fiber.

13. The illumination source of claim 1, wherein at least one of the two or more light sources comprises:
  an incoherent light source.

14. The illumination source of claim 13, wherein the incoherent light source comprises:

at least one of a laser-sustained plasma source or a lamp source.

15. The illumination source of claim 1, further comprising:
  at least one of a tunable spectral filter or a tunable intensity filter.

16. An illumination source comprising:
  two or more input light sources; and
  a collector including one or more lenses to combine illumination from the two or more input light sources into an illumination beam, wherein the illumination from the two or more input light sources occupy different portions of an input aperture of the collector;
  two or more output fibers having different etendues; and
  a fiber coupler configured to selectively couple the illumination beam into a selected output fiber of the two or more output fibers to provide the illumination beam in a selected etendue.

17. The illumination source of claim 16, wherein at least one of the two or more output fibers comprise:
  a beam uniformizer comprising:
    a first noncircular-core fiber, wherein the first fiber receives the illumination beam from the fiber coupler;
    a second noncircular-core fiber; and
    one or more coupling lenses to relay a far-field distribution of the illumination beam from the first noncircular-core fiber to an input face of the second noncircular-core fiber, wherein a near-field output distribution and a far-field output distribution of the illumination beam from the second noncircular-core fiber are uniform within a selected tolerance.

18. The illumination source of claim 17, wherein the first noncircular-core fiber and the second noncircular-core fiber have a common core size.

19. The illumination source of claim 16, wherein at least one of the two or more input light sources comprises:
  a coherent light source.

20. The illumination source of claim 19, wherein the coherent light source comprises:
  a laser source.

21. The illumination source of claim 20, wherein the laser source comprises:
  a supercontinuum laser source.

22. The illumination source of claim 19, further comprising:
  a speckle reducer including at least one phase-varying optical element to generate a plurality of decorrelated distributions of the illumination beam within a selected timeframe to mitigate speckle in the illumination beam.

23. The illumination source of claim 22, wherein the speckle reducer comprises:
  a movable diffuser.

24. The illumination source of claim 22, wherein the speckle reducer comprises:
  a translatable mirror configured to vary a position of the illumination beam on an input face of the selected output fiber.

25. The illumination source of claim 24, wherein the translatable mirror overscans the illumination beam across an input face of the selected output fiber.

26. The illumination source of claim 16, wherein at least one of the two or more input light sources comprises:
  an incoherent light source.

27. The illumination source of claim 26, wherein the incoherent light source comprises:
  at least one of a laser-sustained plasma source or a lamp source.

28. The illumination source of claim 16, further comprising:
  at least one of a tunable spectral filter or a tunable intensity filter.

29. The illumination source of claim 16, further comprising:
  at least one tunable edge filter.

30. The illumination source of claim 16, further comprising:
  a beam uniformizer comprising:
    a first noncircular-core fiber, wherein the first fiber receives the illumination beam from the collector;
    a second noncircular-core fiber; and
    one or more coupling lenses to relay a far-field distribution of the illumination beam from the first noncircular-core fiber to an input face of the second noncircular-core fiber, wherein a near-field output distribution and a far-field output distribution of the illumination beam from the second noncircular-core fiber are uniform within a selected tolerance, wherein the fiber coupler receives the illumination beam from the beam uniformizer.

31. A metrology system comprising:
  two or more input light sources; and
  a collector including one or more lenses to combine illumination from the two or more input light sources into an illumination beam, wherein the illumination from the two or more input light sources occupy different portions of an input aperture of the collector;
  two or more output fibers having different etendues configured to illuminate a sample with the different etendues;
  a fiber coupler configured to selectively couple the illumination beam from the collector into a selected output fiber of the two or more output fibers to provide the illumination beam in a selected etendue; and
  one or more collection optics to direct radiation emitted by the sample in response to the illumination beam to a detector.

32. The metrology system of claim 31, wherein the collector combines the light from the two or more input light sources into a common etendue.

33. The metrology system of claim 31, further comprising:
  two or more collimating lenses to collimate the light from the two or more input light sources, wherein the collector receives the light from the two or more input light sources from the two or more collimating lenses.

34. The metrology system of claim 31, further comprising:
  a beam uniformizer comprising:
    a first noncircular-core fiber, wherein the first fiber receives the illumination beam from the collector;
    a second noncircular-core fiber; and
    one or more coupling lenses to relay a far-field distribution of the illumination beam from the first noncircular-core fiber to an input face of the second noncircular-core fiber, wherein a near-field output distribution and a far-field output distribution of the illumination beam from the second noncircular-core fiber are uniform within a selected tolerance, wherein the one or more illumination optics receive the illumination beam from the beam uniformizer.

35. The metrology system of claim 31, wherein at least one of the two or more input light sources comprises:
  a coherent light source.

36. The metrology system of claim 35, wherein the coherent light source comprises:
a laser source.

37. The metrology system of claim 36, wherein the laser source comprises:
a supercontinuum laser source.

38. The metrology system of claim 35, further comprising:
a speckle reducer including at least one phase-varying optical element to generate a plurality of decorrelated distributions of the illumination beam within a selected timeframe to mitigate speckle in the illumination beam.

39. The metrology system of claim 38, wherein the speckle reducer comprises:
at least one of a movable diffuser or a translatable mirror.

40. The metrology system of claim 31, wherein at least one of the two or more input light sources comprises:
an incoherent light source.

41. The metrology system of claim 40, wherein the incoherent light source comprises:
at least one of a laser-sustained plasma source or a lamp source.

42. The metrology system of claim 31, further comprising:
at least one of a tunable spectral filter or a tunable intensity filter.

43. The metrology system of claim 31, wherein the metrology system comprises:
an overlay metrology system.

44. The metrology system of claim 43, wherein the overlay metrology system comprises:
an imaging overlay metrology system, wherein the one or more collection optics provide an image of the sample on the detector based on the radiation emitted by the sample.

45. The metrology system of claim 43, wherein the overlay metrology system comprises:
a scatterometry overlay metrology system, wherein the one or more collection optics provide a pupil image associated with an angular distribution of radiation emitted by the sample.

46. A beam uniformizer comprising:
a translatable mirror to accept an illumination beam;
a first noncircular-core fiber, wherein the first fiber receives the illumination beam from the translatable mirror;
a second noncircular-core fiber; and
one or more coupling lenses to relay a far-field distribution of the illumination beam from the first noncircular-core fiber to an input face of the second noncircular-core fiber, wherein a near-field output distribution and a far-field output distribution of the illumination beam from the second noncircular-core fiber are uniform within a selected tolerance, wherein the translatable mirror scans the illumination beam across a core of the first noncircular-core fiber to generate a plurality of decorrelated distributions of the illumination beam within a selected timeframe to mitigate speckle in the illumination beam.

47. The beam uniformizer of claim 46, wherein the first noncircular-core fiber uniformizes a spatial distribution of the illumination beam at an output face of the first noncircular-core fiber with respect to a spatial distribution of the illumination beam at an input face of the first noncircular-core fiber within a selected tolerance.

48. The beam uniformizer of claim 47, wherein the second noncircular-core fiber uniformizes a spatial distribution of the illumination beam at an output face of the second noncircular-core fiber with respect to a spatial distribution of the illumination beam at the input face of the second noncircular-core fiber within a selected tolerance.

49. The beam uniformizer of claim 46, wherein the far-field distribution comprises:
an angular distribution of the illumination beam at an output face of the first noncircular-core fiber.

50. The beam uniformizer of claim 46, wherein a core of at least one of the first noncircular-core fiber or the second noncircular-core fiber has a shape of a regular hexagon, a rectangle, or a square.

* * * * *